Patented May 1, 1934

1,956,718

UNITED STATES PATENT OFFICE 1,956,718

PRODUCTION OF MONOCARBOXYLIC ACIDS AND THEIR DERIVATIVES

Alphons O. Jaeger, Mount Lebanon, Pa., assignor to The Selden Company, Pittsburgh, Pa., a corporation of Delaware No Drawing. Application May 13, 1929, Serial No. 362,866

18 Claims. (Cl. 260—108)

This invention relates to catalytic processes of producing monocarboxylic acids from polycarboxylic acids, and particularly from dicarboxylic acids.

In the past monocarboxylic acids have been produced from certain dicarboxylic acids and polycarboxylic acids by various methods, usually involving the heating of salts of the polycarboxylic acids. A typical example is the production of benzoic acid from phthalic acid by heating phthalic anhydride with caustic soda or lime to a high temperature. The processes are expensive, awkward, and frequently give poor yields and impure products. They are at present for the most part of little or no practical importance.

It has also been proposed to prepare benzoic acid from pure phthalic anhydride by vapor phase catalytic splitting in the presence of steam, the process being described and claimed in United States patent to Courtney Conover No. 1,645,180 dated October 11, 1927, and more broadly as applied to production of monocarboxylic acids generally in my co-pending application Serial No. 223,845, of which the present application is in part a continuation. I have also described in my Patent No. 1,714,956 dated May 28, 1929, a process of producing monocarboxylic acids from polycarboxylic acids by catalytic splitting in the vapor phase in the presence of hydrogen or other reducing gas.

According to the present invention impure polycarboxylic acids or their derivatives such as anhydrides, esters, and the like are subjected to vapor phase catalytic decarboxylation in the presence or absence of steam or reducing gases, or both depending on the material treated. Surprising as it may seem, many impurities do not appear to injuriously affect the reactions covered by the present invention and a very notable saving in cost of raw material is obtained. This is especially true where the process of the present invention is combined with the vapor phase catalytic production or sublimation of polycarboxylic acid substances and their derivatives such as phthalic anhydride, naphthalic anhydride, maleic acid, etc., as described in my co-pending application Serial No. 223,845 above referred to. Strange as it may seem, it is possible to take the gases from a converter in which phthalic anhydride or other polycarboxylic acid substance is being produced or from a sublimer in which it is being purified by fractional sublimation and either use the gases directly, if necessary with the addition of steam or hydrogen, or both, for the production of the corresponding monocarboxylic acids or their derivatives, or the gas stream may be subjected to fractional condensation, especially where the condenser is maintained at a carefully predetermined temperature at which the highest purity product condenses the remaining vapors containing crude phthalic anhydride utilized as raw material for the process of the present invention. Such a combined process presents most attractive commercial features as without further cost a portion of the polycarboxylic acid can be recovered in a state of high purity and the impure remainder subjected to the process of the present invention. Great savings in handling cost are thereby obtained, and in the case of sublimations it is feasible to carry out the process in a circulatory manner with a carrying gas stream, inert or active in the splitting reactions, which gives better results both in the sublimation and in the subsequent splitting reaction.

Of course crude polycarboxylic acid substances, for example crude phthalic anhydride, crude naphthalic anhydride, e. g. so-called crude converter product, etc., may be vaporized and subjected to the process of the present invention. Another very economical procedure is to purify a polycarboxylic acid substance, such as phthalic anhydride or naphthalic anhydride, by subliming a portion with fractional condensation and breaking off the sublimation at the point where the sublimate begins to show impurities. The remaining crude material in which the content of the impurities is even higher than before can be effectively treated by the present invention and extraordinarily effective purification of the portion of the polycarboxylic acid first sublimed over is obtained without waste. Where the polycarboxylic acid substance contains many impurities which are more volatile than the substance itself including in some cases water, the above procedure may be reversed, that is to say the material may be subjected to a fractional sublimation and the vapors first coming over instead of being condensed pass through a converter where the polycarboxylic acid is transformed into a monocarboxylic acid by means of the present invention. When the fractional sublimation has proceeded to a sufficient extent so that the polycarboxylic acid vapors coming over are relatively pure, they may be led to condensers and polycarboxylic acid of high purity recovered.

These combined processes are extremely attractive, particularly in the case of phthalic anhydride and substituted phthalic anhydrides where both the polycarboxylic acid and the corresponding monocarboxylic acid are salable products. A single operation thus produces both products in a state of high purity and the process cost is very greatly decreased as the same fuel consumption required in purifying the polycarboxylic acid substance is in many cases sufficient to effect the transformation of the more impure portions of the product into the monocarboxylic acid. Many such combined processes are, of course, possible and the degree to which purification of polycarboxylic acid is combined with the production of monocarboxylic acid from the crude residues will depend, of course, on the nature of the crude polycarboxylic acid produced and on the relative markets for the two products.

The present invention is applicable generally to polycarboxylic acids and their derivatives, such as anhydrides and esters. Among typical polycarboxylic acid substances may be mentioned phthalic anhydride, naphthalic anhydride, diphenic acid, maleic acid, succinic acid, adipic acid, pyrotartaric acid, glutaric acid, etc. Substituted polycarboxylic acid substances such as halogen, nitro, amino, halogennitro, etc., may also be used, producing in many cases the correspondingly substituted monocarboxylic acid. In some cases where the reaction takes place in the presence of hydrogen or other reducing gases or vapors, of course aldehydes will be formed to a greater or less extent depending on the catalyst used and on the reaction conditions, and where nitropolycarboxylic acid substances are used the nitro group is in many cases reduced to the amino group and in some cases condensations take place.

It is desirable, particularly when dealing with anhydrides, to carry out the reaction in the presence of steam although this is not essential in all cases, especially where hydrogen or other reducing gases are present. The steam may be introduced in any suitable manner and may vary in amount, preferably being in suitable excess, for example from ten times the weight of the polycarboxylic acid up, but smaller amounts of steam may be used in many cases and the invention is not limited to any particular amount of steam present.

Gases such as nitrogen, carbon dioxide, hydrogen, and the like may also be used in a circulatory or noncirculatory process and the reaction may be carried out under a vacuum, atmospheric pressure, or elevated pressures. I have found in many cases a moderate pressure is helpful and from 3 to 5 atmospheres is very suitable with many catalysts. Higher pressures, however, may be used.

The choice of the catalyst and reaction conditions will determine in most cases whether substantially all of the polycarboxylic acid is transformed into monocarboxylic acids or whether these latter are produced in admixture with some of the unchanged polycarboxylic acid.

The catalysts include metals, metal oxides, hydroxides, carbonates, salts, both simple and double, and other compounds used singly or in admixture, with or without diluents or carriers, such as pumice, quartz, quartz filter stones, fragments of earthenware, silicates, particularly materials rich in silicon, both natural and artificial. Among the effective catalytic components which favor the splitting off of carbon dioxide and water are finely divided nickel, copper, iron, zinc, cadmium, FeO, $Fe_2O_3$, $Al_2O_3$, $TiO_2$, CuO, ZnO, CdO, NiO, $Ce_2O_3$, $ZrO_2$, $UO_3$, $U_3O_8$, $SnO_2$, $CdCO_3$, $ZnCO_3$, $CuCO_3$, $NiCO_3$, $ThO_2$, oxides of manganese, lead and the rare earths, carbonates of calcium, borium and lithium, calcium hydroxide, soda lime, double salts of thorium, and alkaline earth metals and the like. These catalytic components may be present singly or in admixture.

Minerals can also be used, such as, for example, bog iron ore, bauxite, pyrolusite and the like.

Very effective contact mass compositions are those containing greater or less amounts of calcium hydroxide or carbonate, or a mixture of calcium and barium carbonates, a mixture of hydroxides or carbonates of calcium and alkali metals, in addition to the oxides and carbonates of the metals copper, nickel, iron, zinc, cadmium, cobalt, lead, aluminum and zirconium.

Basic metal salts, particularly tungstates, molybdates, vanadates, chromates, tantalates, bismuthates, antimoniates, single or in admixtures, are also catalytically effective for the splitting of carboxyl groups from polycarboxylic acids in the vapor phase. But these salts which are for the most part less active than the catalysts described above require in general higher reaction temperatures and tend to produce mixtures of poly- and monocarboxylic acids.

Another very important class of catalysts, particularly those containing the catalytic components enumerated above, are base exchange bodies both zeolites and non-silicious, natural and artificial. These base exchange bodies may contain the catalytically active element in non-exchangeable form or as an exchangeable base, and may be both diluted or undiluted. In the former case the zeolite itself may be the catalyst, or the diluent may be catalytically active, or both. Salt-like bodies formed by the action of compounds containing suitable anions with zeolites are also effective in many cases for the reaction, and are included. It should be understood that the zeolites may be either two-component zeolites, that is to say, the reaction products either of metallates or of metal salts with soluble silicates, or they may be the so-called multi-component zeolites, which are reaction products of at least one metallate, at least one metal salt or at least one soluble silicate, which products are described in my prior Patent No. 1,728,732, dated September 17, 1929.

I have found that very desirable catalysts or carriers can also be obtained by treating base exchange bodies with mineral acids to leach out the alkaline exchangeable bases and part or all of the metal elements present in non-exchangeable form. These are the so-called metallosilicic acids or cyclosilicic acids, and share some of the characteristics of zeolites and non-silicious base exchange bodies, particularly their high and frequently submicronic porosity, which renders them so important as contact masses.

It is desirable in many cases to subject catalysts or contact masses such as those described above to the action of reducing gases at elevated temperatures, such as, for example, hydrogen, water gas, illuminating gas, methane and the like, which in many cases reduces some or all of the metal compounds present to the metallic state, the metals being in an extraordinarily finely divided state. Such catalysts are particularly effective when the reduced metals are associated with alkaline earth compounds, such as, for example, calcium carbonate.

While the metal oxides above described are all suitable, I have found that mild reduction catalysts such as compounds of zinc, copper, etc., or the metals themselves are among the most effective catalysts for the present invention. When the reaction is to be carried out in the presence of hydrogen or other reducing gases and it is desired to produce aldehydes, catalysts containing metals of stronger reducing power such as iron, cobalt, may be used but in such cases care should be taken that the temperature is not sufficiently high to transform excessive quantities of the monocarboxylic acid substances produced to the corresponding hydrocarbons or to initiate undesired side reactions.

The invention will be described in greater detail in connection with the following specific examples which are illustrations of typical embodiments.

*Example 1*

6.55 parts of copper nitrate are dissolved in 50 parts of water and precipitated in the form of basic copper carbonate by means of a 2N sodium carbonate solution. The precipitate is sucked, lightly washed with water and then kneaded with 6 parts of calcium hydroxide with the gradual addition of 90 parts of water. The suspension thus obtained is then coated on to 200 volumes of pea size pumice granules, preferably by heating the pumice and spraying the suspension onto it with agitation, the excess water being evaporated and a completely uniform coating of the pumice granules being effected.

Crude phthalic anhydride such as, for example, crude converter product is vaporized, the vapors mixed with steam in amount from ten to fifty times the weight of the phthalic anhydride and passed over the contact mass, which is maintained at a temperature from 380–420° C.

The resulting reaction product consists essentially in benzoic acid contaminated more or less with phthalic acid, depending on the loading. A loading of four parts of phthalic anhydride per hour per 160 volumes of contact mass at 400–420° C. gives yields of benzoic acid amounting to about 85% of the theory based on the phthalic anhydride content of the crude material.

The benzoic acid can be separated in any suitable manner, for example as described in my prior Patents No. 1,694,124 dated December 4, 1928, No. 1,686,913 dated October 9, 1928 and No. 1,685,634 dated September 25, 1928.

When the reaction conditions are not kept perfect or when excessive amounts of impurities are present, small amounts of benzol, diphenyl, benzophenone and anthraquinone may be identified in the reaction product, but are easily separated from the benzoic acid by the usual means.

Instead of using crude converter product, the gases from a sublimer in which crude phthalic anhydride is being purified are passed through a condenser maintained at a temperature at which substantially pure phthalic anhydride precipitates out. The remaining gases containing phthalic anhydride together with the impurities are passed over the contact mass under the reaction conditions given above, the yield being substantially as high as when crude converted product is used.

Similar results are obtained when chlor- or nitrophthalic anhydrides are used.

Instead of using copper carbonate as the catalytically effective component of this contact mass, copper oxide, nickel oxide or carbonate and the oxides or carbonates of iron, zinc, cadmium, lead, aluminum, titanium, manganese and thorium may be used singly or in admixture.

Calcium hydroxide may be substituted by barium hydroxide or carbonate, soda lime, lithium carbonate or mixtures of the oxides and salts of the alkali and alkaline earth metals. Very effective catalysts for the above process can also be obtained by treating the contact mass described with reducing gases such as hydrogen, water gas and the like, usually the treatment taking place at temperatures from 200 to 400° C. and resulting in the reduction of most of the copper compounds to finely divided copper.

The phthalic anhydride vapor-steam mixture may also be diluted or mixed with indifferent gases such as, for example, nitrogen, in which case the reaction product may frequently be obtained in solid form. The reaction gases mixed with the excess steam and indifferent gases after leaving the converter are cooled down sufficiently to precipitate the monocarboxylic acids produced in solid form, the temperature however being kept sufficiently high so that the excess steam and indifferent gases pass on and can be recirculated through the converter after the addition of the necessary components to re-establish the desired proportions of the reaction ingredients. Carbon dioxide can be permitted to accumulate, and then acts as part or all of the inert gas, or it may be removed from the mixture of steam and fixed inert gas by absorption in alkalies or solution in water under pressure. Air may also be mixed with the vapors of polycarboxylic acid substance, such as phthalic anhydride and steam, in which case preferably a greater excess of steam is to be used than when the diluting gas is completely indifferent, as is nitrogen, since under the reaction conditions a catalytic oxidation process might start with some of the catalysts in the presence of the oxygen of the air, which reaction is partly or wholly prevented by sufficient excess steam. Normal amounts of steam may be used where the contact mass is sufficiently strongly stabilized.

*Example 2*

Contact masses are prepared as described in Example 1, and a mixture of vapors of crude maleic acid and steam are passed over the catalyst at 320–380° C. Acrylic acid is obtained as the main reaction product. The process may also be carried out as a circulatory process, using an indifferent gas, or using air, as described in connection with the production of benzoic acid in Example 1, the reaction conditions of course being adjusted for the splitting off of carbon dioxide from maleic acid instead of phthalic.

*Example 3*

(1) A solution of 30–36° Bé. potassium water glass diluted with 10 to 12 volumes of water and containing 48 to 96 parts of $SiO_2$ is treated with sufficient 20 per cent ammonia water until the cloudiness which has formed clears up.

(2) 29 parts of copper nitrate plus 6 $H_2O$ are dissolved in water to form a N/10 solution, and sufficient strong ammonia water is added until the precipitate which first forms dissolves up again to form a deep blue cuprammonium compound, which is then poured into solution (1) with vigorous stirring.

A 10 per cent aluminum nitrate solution is prepared and is gradually added to the mixture of water glass and cuprammonium nitrate solution until the reaction mixture is just neutral to phenolphthalein. The reaction product consists of a deep blue gel, which is pressed and dried, when it forms greenish-blue fragments of conchoidal fracture, which disintegrate into small pieces when placed in hot water. The cuprammonium complex can be replaced partly or wholly by nickel complexes, and the aluminum nitrate may also be replaced partly or wholly by other metal salt solutions, such as those containing copper, nickel, iron, manganese, cobalt, silver, lead or zinc, singly or in admixture.

The contact masses thus produced consist of three component zeolites, and are treated with sufficient 5 per cent calcium chloride solution to replace the exchangeable alkali by calcium. This can preferably be effected by trickling the calcium chloride solution over the base exchange body. It is also advantageous to first trickle water over the base exchange body before attempting base exchange.

The contact mass is filled into a converter and crude naphthalic anhydride vapors mixed with a great excess of steam are passed over the catalyst at 360–420° C., naphthoic acid being obtained contaminated with some naphthalene and some naphthalic anhydride.

Instead of vaporizing crude naphthalic anhydride, the gases from a converter in which acenaphthene is catalytically oxidized to naphthalic anhydride are passed over the catalyst after a suitable addition of steam or hydrogen, or both. If desired the vapors containing naphthalic anhydride may be subjected to condensation at a temperature at which only naphthalic anhydride condenses out, thus resulting in the removal of part of the naphthalic anhydride in a state of very high purity, the remaining naphthalic anhydride in the exhaust gases being transformed into naphthoic acid by passing over the contact mass after suitable addition of steam.

Instead of using crude naphthalic anhydride, vapors of similar crude phthalic anhydride may be used, benzoic acid being produced as the main product.

In the same manner phenylbenzoic acid can be produced from crude diphenic acid, acrylic acid from crude maleic acid, propionic acid from crude succinic acid, butyric acid from crude pyrotartaric acid, and various halogen-, nitro- or aminobenzoic acids from the corresponding phthalic acids. Substituted naphthalic or diphenic acids may also be split by means of the same catalyst.

When a crude ester, such as crude dimethylphthalate, is vaporized and passed over the contact mass at the temperatures given above, a mixture containing benzoic acid, methylbenzoate and small amounts of impurities is obtained.

The zeolites described above can advantageously be diluted without substantial loss of efficiency by introducing kieselguhr, pumice meal, ground quartz or the like, into the zeolites, particularly during formation.

The contact masses, diluted or undiluted, may be coated onto artificial or natural carrier fragments or formed thereon in situ. Examples of such carrier fragments are pumice stones, filter stones, aluminum granules and granules of metal alloys such as ferrosilicon, ferrovanadium, ferrochrome, and the like, particularly when the surface of the granules has been roughened or etched. Alkalies or alkaline earths may be used as cementing agents, and tend to activate the catalysts.

*Example 4*

Freshly precipitated aluminum hydroxide containing 10 parts of $Al_2O_3$ are dissolved in a 2N potassium hydroxide solution to form potassium aluminate with a 10 per cent excess of caustic potash. 66 parts of aluminum sulfate plus 18 $H_2O$. are dissolved in about 200 parts of water and 17 to 18 parts of "Celite" (the compacted form of kieselguhr mined on the Pacific coast of the United States by the Celite Products Corporation) brick refuse or other materials rich in silica, such as glaucosil or polysilicates with or without base exchanging powers are stirred in to the aluminum sulfate solution. Examples of excellent polysilicates are those of calcium, copper, iron, zinc, strontium and barium. These polysilicates not only act as diluents but also positively activate and increase the catalytic power of the contact mass for the particular reaction.

The aluminum sulfate suspension is gradually added to the aluminate solution with vigorous agitation until the solution remains strongly alkaline to litmus or preferably neutral or weakly alkaline to phenolphthalein. The reaction product obtained is freed from the mother liquor and dried at a temperature below 100° C., whereupon it is broken into small fragments and constitutes a diluted non-siliceous base exchange body.

The reaction product fragments are hydrated by trickling water over them and then part of the exchangeable alkali base is exchanged for a corresponding amount of calcium oxide to barium oxide in the usual manner, using a 5 to 10 per cent solution of the corresponding water soluble salts. After this treatment the base exchange body is impregnated with a chromic acid solution containing 3 to 5 per cent $CrO_3$ in order to form the chromate of the diluted base exchange body, which is a salt-like compound and possesses many of the characteristics of a salt, but is of a chemical constitution not yet definitely determined. The particles are then again dried and used directly as contact masses.

Superheated steam is blown through crude phthalic anhydride such as ordinary converter product or even the tailings from the fractional condensation of the phthalic anhydride vapors from the converter. The temperature is maintained at about 190° C. in order to produce a gaseous mixture of phthalic anhydride and steam, which is then passed over the contact mass described above at 340–450° C., benzoic acid being obtained in good yields.

Instead of crude phthalic anhydride, crude derivatives of phthalic anhydride such as di- or tetrachlorphthalic anhydride, especially the crude mixture from chlorinating phthalic anhydride, may be substituted, the corresponding benzoic acid of course being obtained.

*Example 5*

Naphthalene vapors mixed with air in the proportion of 1 to 20 are passed over a suitable oxidation catalyst at 370–420° C. An example of such a catalyst is vanadium pentoxide precipitated on aluminum granules. Phthalic anhydride is produced as an intermediate product in good yield and the phthalic anhydride vapors, associated with the partly deoxygenated air and with steam, are cooled to about 340–360° C. with the addition of further superheated steam. This mixture is then passed over a catalyst for splitting off carboxyl groups, thus producing a good yield of benzoic acid from naphthalene in a continuous process.

An example of a good catalyst to be used in this second step is the following:—A mixture of 4 parts of zinc oxide and 5 parts of aluminum oxide, freshly precipitated from the corresponding salt solutions by means of 20 per cent ammonia water, are treated with sufficient 2N caustic soda solution to produce a solution of sodium zincate and sodium aluminate. 24–30 parts of $SiO_2$ in the form of an ordinary water glass solution of 33–36° Bé. are diluted with 15–20 volumes of water and 80–100 parts of "Celite" brick refuse and glaucosil or colloidal silicic acid are added. The suspension and solution are mixed together with vigorous agitation and warmed to 50–60° C., whereupon gradually part of an aluminum zinc zeolite precipitates out. In order to increase the yield of this zeolite a 3 to 5 per cent dilute mineral acid such as nitric acid, sulfuric acid or hydrochloric acid is added in a thin stream with vigorous agitation, care being taken that the reaction mixture after complete addition of the acid remains alkaline or neutral to phenolphthalein. A gelatinous mass is obtained, which is freed from the mother liquor by pressing, dried at temperatures under 100° C. and then hydrated in the usual manner with 600–1,000 parts of water. After hydrating it is treated with a 1 to 2 per cent mineral acid solution, such as hydrochloric acid or sulfuric acid until substantially all of the exchangeable sodium oxide is dissolved out, producing so-called metallosilicic acid, which in the present case is a zinc aluminum silicic acid diluted with the materials described above. This body is then dried, and can be directly used for the splitting of the carboxyl group in the process of this example, and gives good results.

Such a contact mass can also be prepared by treating a water glass solution, containing the diluents as described above, with 5 to 10 per cent solutions of the salts of zinc and aluminum instead of the metallates. For example, nitrates or sulfates may be used, and a zeolite is formed of the aluminum double silicate type which is then subsequently treated as described above and results in a very effective contact mass. Care should be taken, however, that after adding all of the metal salt solutions to the water glass suspension the reaction mixture must remain alkaline or neutral to phenolphthalein.

The aluminum and zinc compounds described above may be replaced partly or wholly by compounds of other metals having an amphoteric character, such as, for example, beryllium, cadmium, titanium, zirconium, tin, chromium and particularly lead. These metal compounds may be used singly or in admixture.

The metallosilicic acids described above may also be pulverized and kneaded with sufficient soda lime in paste form until the mass can be readily formed into pieces. The amount of soda lime which can be used can be varied within wide limits.

Zeolites which have not been treated with mineral acids to form the metallosilicic acids may also be used as contact masses in the second step of the process of this example, but in such a case it is desirable to replace part of the exchangeable alkali by calcium, barium or strontium, or by a mixture of these.

Natural silicates can also be used, particularly when they have been formed under conditions which permit them to remain for a considerable time in the zeolite phase. They may advantageously be diluted with minerals which contain one or more catalytically effective elements.

In the same manner monochlornaphthalene may be oxidized to monochlorphthalic acid and the latter split to monochlorbenzoic acid.

Of course, instead of using the converter gases directly, part of the phthalic anhydride may be condensed out at a temperature sufficiently high so as to assure that the accompanying impurities remain volatile and the uncondensed gases with suitable addition of steam or hydrogen, or both, are passed over the splitting catalyst.

*Example 6*

Crude nitrophthalic acid obtained by nitrating acid and consisting of a mixture of 3- and 4-nitrophthalic acids is vaporized with nitrogen at 220° C. and passed over contact masses such as those described in the foregoing examples at 400–450° C., steam being added in an amount from ten to twenty times the weight of the nitrophthalic acid in the crude product. Nitrobenzoic acid is obtained in good yield under these reaction conditions, and it should be noted that the product consists mainly of paranitrobenzoic acid, smaller amounts of metanitrobenzoic acid being obtained.

*Example 7*

200 volumes of quartz fragments, which are retained by a six-mesh screen, are boiled in a 20 N. KOH solution for three hours and then washed with water followed by diluted hydrochloric acid in the proportion of 125 c. c. of concentrated hydrochloric acid per liter of water. The quartz fragments are then heated and agitated and a sodium chloride solution containing 110–120 grams per liter of water is sprayed onto the quartz. The water from the solution is immediately vaporized on coming into contact with the quartz fragments and produces a very uniform coating.

The contact mass is filled into a converter and a mixture of vapors of crude phthalic anhydride, such as converter product, and hydrogen in the proportion of 1 kilo of crude phthalic anhydride per 3–5 cbm. of hydrogen are passed over the contact mass at 360–420° C. Large quantities of benzoic acid are obtained and the reaction product when steam distilled yields a white solid which is volatile with steam and soluble in hot water. After filtering off the product and drying, it shows a melting point of 123–124° C. and therefore consists of chemically pure benzoic acid which can be used for medicinal or food preservative purposes.

The reaction product is analyzed by dissolving in boiling water under a reflux, extracting the water solution with chloroform, washing with a little water which is returned to the main water solution, evaporating the chloroform to dryness on a steam bath, dissolving the residue in hot water, and titrating both the water solution of the chloroform soluble material and the water solution which was extracted with chloroform. The titration of water solution which has been treated with chloroform is reported as phthalic acid and the titration of the chloroform extracted material is considered as benzoic acid. Using this method of analysis the product shows from 75–90% conversion of crude phthalic anhydride to benzoic acid, leaving a small residue of unchanged phthalic acid and some water insoluble material in addition to a little benzol.

The sodium chloride can be partly or wholly replaced by compounds of lithium, potassium, rubidium, caesium, magnesium, calcium, strontium, or barium, the chlorides, phosphates and borates of these elements being very effective.

The quartz may also be replaced with other carrier materials, such as pumice, bauxite, alunite, diaspore, unglazed porcelain, natural and artificial zeolites and non-siliceous base exchange bodies, especially leached zeolites and non-siliceous base exchange bodies, asbestos, various minerals, silicates, metals, metal alloys, silica gel, slag wool, etc. Apparently the carrier acts partly as a catalyst and partly as an activator. The reaction may be carried out with or without the addition of steam.

Instead of using crude converter product, it may be sublimed with hydrogen or other reducing gas, a portion of the phthalic anhydride condensed out at a temperature sufficiently high to assure maintaining the impurities in a gaseous form, and the remaining phthalic anhydride passed over the contact mass with the reducing gas used in the sublimation. Benzoic acid of almost as high purity is obtained, the conversion being only slightly less than when the whole of the crude converter product is used.

Instead of crude phthalic anhydride, derivatives of phthalic anhydride may be used, such as, for example, nitrophthalic anhydrides, the corresponding amino benzoic acids being obtained, together with some condensation products.

Example 8

200 volumes of crushed pumice stone retained on a six-mesh screen are coated with 10 parts by weight of zinc oxide in the form of the hydroxide by dissolving 36.5 parts of zinc nitrate with 6 mols of water in 250 volumes of water, precipitating out the hydroxide with concentrated ammonia, filtering, washing and forming a slurry of the cake in 220 volumes of distilled water. The suspension is sprayed onto the pumice, which is heated. The pumice may advantageously be treated with diluted nitric acid before use and dried.

The contact mass is placed in a converter and a mixture of crude phthalic anhydride and hydrogen in the ratio of 2.95 kilos of crude phthalic anhydride vapors per 6.75 cbm. of hydrogen is passed over the contact mass at temperatures between 350 and 450° C., preferably between 380 and 400° C. Large quantities of benzoic acid are obtained sometimes contaminated with traces of benzaldehyde and benzol. The yields, determined by method of analysis described in Example 7, are from 78 to 94% of the crude phthalic anhydride consumed when reaction temperatures are between 380 and 400° C. When higher temperatures are used, small amounts of benzaldehyde separate out from the cooler portions of the condenser and the yields of benzoic acid are between 65 and 75% of the theory because of the formation of some benzol.

By choosing a ratio of crude phthalic anhydride to hydrogen which gives a very large excess of hydrogen the conversion to benzoic acid proceeds very smoothly with excellent yields. It has been found that a large excess of hydrogen is favorable for the reaction and a certain improvement is also obtained when hydrogen is mixed with steam. In such cases the benzoic acid obtained is white and nearly chemically pure.

The analysis of the exhaust gases shows a large content of carbon monoxide and sometimes some carbon dioxide. The exhaust gases can be recirculated, preferably after washing out the carbon monoxide in the usual way.

The hydrogen may be replaced with other reducing gases or vapors, such as vapors of methyl alcohol. In such cases benzoic acid of excellent purity is obtained having a melting point of 123–124° C. and a boiling point of 248–250° C. Considerable yields of methyl benzoate having a boiling point of 198–200° C. are also obtained; the main product, however, is benzoic acid. Similar results are obtained when various fuel or illuminating gases are used. The zinc in the contact mass may be partly or wholly replaced by beryllium, cadmium, boron, aluminum, titanium, zirconium, tin, lead, thorium, cerium and other rare earths. The elements may be present as oxides or salts or other compounds with or without carrier materials. Other elements of the periodic system may also be present in the contact masses and many minerals form excellent contact masses. Examples of such minerals are cryolite, spinel, corundum, topaz, witherite, barite, calcite, magnesite, dolomite, vanadinite, apatite, borax, carnallite, feldspar, muscovite, rutile, ilmenite, titanite, zircon, thorite, pyromorphite, and the like.

Nitro or halogen substituted phthalic anhydrides may be used instead of the crude unsubstituted phthalic anhydrides above described, the corresponding benzoic acids and benzaldehydes being obtained, except that where nitrophthalic acids are obtained the nitro-groups are reduced to amino-groups.

Example 9

25.75 parts of copper nitrate with 3 mols of water are dissolved in 120 volumes of distilled water, or a corresponding amount of copper nitrate is suspended in water. The copper suspension, or solution is sprayed onto 200 volumes of pumice fragments, which are heated sufficiently so that the water of the dispersion is rapidly vaporized on striking the pumice fragments. A uniform coating is obtained, and the contact mass is then treated with reducing gases such as hydrogen, water gas, methyl alcohol or methyl formate vapors. The contact mass is filled into a converter, and a mixture of crude phthalic anhydride vapors and hydrogen, in the ratio of 2.5 kilos of crude phthalic anhydride per 8 cbm. of hydrogen is passed over the contact mass at 360–400° C. The reaction product is fractionally condensed, benzoic acid being the main product in the first condensing chamber while some benzaldehyde is to be found in the tailings. The benzoic acid is purified by steam distillation, which removes impurities such as benzol, and after purification it possesses a melting point of 123–124° C., indicating that the acid is of excellent purity. The boiling point of the sample was 248–250° C., and where esterified with methanol the product shows a boiling point of 199.2° C. and gives a characteristic odor of methyl benzoate. The benzaldehyde obtained was identified by its odor, and possesses a boiling point of 175–180° C. The yield of benzoic acid is between 65 and 75% of theory, and no traces of phthalic anhydride are discernible. Small traces of brown oily materials of intermediate constitution are obtained as impurities.

If steam is added to the mixture of the vapors of crude phthalic anhydride and hydrogen, benzoic acid of high purity is obtained, which can be used directly for the preparation of esters such as methyl, ethyl, butyl, benzyl, amyl or cyclohexyl benzoates. Part or all of the copper in the contact mass may be replaced by iron, cobalt, lead, silver or gold. The elements may be present as such or in the form of oxides or salts.

These contact masses partially decompose the benzoic acid, and small quantities of benzol, benzophenone, diphenyl, anthraquinone, anthracene, 9-phenylfluorene, and appreciable amounts of benzaldehyde are obtained as by-products. The addition of salts of the alkali and alkaline earth metals considerably improve the action of the contact masses for the production of benzoic acid.

Example 10

12 parts of freshly precipitated $Fe_2O_3$ are suspended in 150 parts of water, and 8 parts of potassium chloride are dissolved in the suspension. The suspension is then coated onto roughened quartz fragments, quartz filter stones, pumice fragments or unglazed porcelain fragments. The contact masses may then be directly used for the transformation of crude phthalic anhydride to benzoic acid. Thus, for example, if a mixture of vapors of crude phthalic anhydride with reducing gases, such as water gas, methanol vapors, illuminating gas, ethylene and the like, in the ratio given in Example 9 is passed over the contact mass at 360–400° C. benzoic acid of high purity is obtained with yields of between 79 and 92% based on the crude phthalic anhydride consumed. Only minute amounts of benzaldehyde are obtained.

Any other catalytic element having high activity for reduction or hydrogenation can be used to replace part or all of the iron, thus, for example, cobalt, nickel, copper, silver, gold, lead, thallium, zinc, may be used, singly or in admixtures, especially when associated with stabilizing compounds such as the salts of the alkali forming metals. The potassium chloride described above can be substituted partly or wholly by other salts of potassium, or salts of lithium, sodium, rubidium, caesium, magnesium, calcium, strontium, or barium, may be used. Suitable salts, in addition to the chlorides, are phosphates, nitrates and some sulphates.

The contact masses may also be modified further by the addition of components containing one or more of the elements aluminum, beryllium, titanium, strontium, zirconium or tin. These components may be considered to enhance or promote the action of the stabilizers in these specific contact masses.

If the loadings mentioned above are exceeded smaller or larger amounts of unreacted crude phthalic anhydride are obtained in addition to the benzoic acid. The two acids can be easily separated by continuous leaching with benzol, chloroform or other solvents which preferentially dissolve benzoic acid. Another very effective method for separating the two acids, where they are obtained practically anhydrous, consists in esterifying them with the ordinary alcohols such as methyl, ethyl, propyl, isopropyl, butyl, isobutyl, hexyl, benzyl, cyclohexyl and the like. The corresponding esters are obtained, and possess very markedly different boiling points, so that a ready separation by fractional distillation is practicable. Thus, for example, methyl benzoate has a boiling point of 199.2° C., whereas dimethyl phthalate has a boiling point of 282° C. The difference in boiling point, 82.8° C., is so great that effective separation by fractional distillation can be effected. The mixture of the esters may also be used directly, for some purposes, such as, for example, as plasticizers for resins and other plastic compositions such as those containing cellulose esters. After separation of the esters they can be saponified and a chemically pure benzoic acid can thus be obtained, while the alcohol can be recovered and reused.

Example 11

12 parts of freshly precipitated aluminum vanadate are suspended in 120 parts of water and then coated onto comminuted unglazed porcelain, for example by the method described in the foregoing examples. The contact mass is filled into a converter, and crude phthalic anhydride vapors mixed with reducing gases such as illuminating gas, together with some steam, in the ratio of 3.5 kilos of crude phthalic anhydride to 8–10 cbm. of reducing gas, are passed over the contact mass under reaction conditions such as those described in the foregoing examples. A technical grade of benzoic acid is obtained and the yield amounts to 80–86% of the theory based on the crude phthalic anhydride consumed.

Instead of using crude phthalic anhydride vapors, vapors of the crude esters of phthalic acid, such as dimethyl phthalate and diethyl phthalate may be used with or without reducing gases such as hydrogen and with or without small amounts of steam. The resulting products are benzoic acid and methyl benzoate or ethyl benzoate, respectively, together with small amounts of benzaldehyde.

The salt used may be partly or wholly replaced by other salts of the metal acids of the 5th and 6th groups of the periodic system, such as columbic, tantalic, bismuthic, chromic, molybdic or tungstic acid. The salts may be present singly or in admixture. The basic radical of the salts may contain one or more of the following elements:—aluminum, beryllium, magnesium, calcium, zinc, strontium, cadmium, barium, copper, silver, titanium, zirconium, tin, lead, iron, cobalt, nickel, manganese. Tin salts of chromic acid are particularly effective. In many cases the contact mass composition may be stabilized by the addition of alkali or alkaline earth metal salts.

Example 12

A solution of 30–36° Bé. sodium waterglass, diluted with 10–12 volumes of water, in an amount containing 48–50 parts of $SiO_2$ is treated with sufficient 20% ammonia water until the cloudiness which first forms clears up. 29 parts of copper nitrate with 6 mols of water are dissolved in water to form a 10 N. solution, and sufficient strong ammonia water is added until the precipitate which first forms again dissolves up to a deep blue solution. The cuprammonium solution is then poured into the waterglass with vigorous agitation. A 10% aluminum nitrate solution is prepared and gradually added to the mixture of waterglass and cuprammonium nitrate solution until the reaction mixture is just neutral to phenolphthalein. The reaction product is a deep blue gel, which is pressed and dried, and then forms greenish blue fragments with conchoidal fracture.

Instead of using a cuprammonium complex other complex compounds may be used, or metallates such as sodium aluminate, sodium zincate, sodium chromite, or sodium plumbite, may be used, singly or in admixture. The aluminum nitrate may also be replaced partly or wholly by one or more metal salt solutions such as those containing titanium, zirconium, zinc, iron, chromium, vanadium or tungsten.

Contact masses prepared as described above consist of three component zeolites, or, if solution 2 is not used, of two component zeolites. These zeolites may be used directly as contact masses or they may be subjected to a preliminary treatment with a 5% calcium chloride or copper nitrate solution or similar salt solutions containing other elements such as iron, cobalt, nickel, zinc, magnesium, barium or lead. The exchangeable alkali metal bases are replaced by these salts, and the process may be preferably carried out by first hydrating the zeolites with water before commencing base exchange.

The zeolites described above can advantageously be diluted with most various diluents, such as kieselguhr, pumice meal, ground quartz, glaucosil (the acid leached residue of greensand), minerals, etc. The base exchange bodies may also be coated onto artificial or natural carrier bodies, or formed thereon in situ. Examples of such carrier fragments are filter stones, aluminum granules, granules of metal alloys such as ferrosilicon, ferrovanadium, ferrochrome, and the like. Alkalies or alkaline earths may be used as cementing agents.

Similar contact masses may be obtained by treating the zeolites, especially after exchanging part of the exchangeable alkali for other elements, with acids such as hydrochloric acid, phosphoric acid, and especially the metal acids of the 5th and 6th groups of the periodic system, in order to form so called salt like bodies with these acids.

Other effective contact masses are obtained by leaching the base exchange bodies produced above with dilute acids, and the amount of leaching may be greatly varied. When the leaching is carried to the limit a very reactive silicic acid is obtained, which is also an effective catalyst for the process.

Crude phthalic anhydride vapors mixed with hydrogen and steam in the ratio of 1 kilo of crude phthalic anhydride to 4–6 cbm. of hydrogen and 15–20% by weight of water are passed over any of the contact masses described above at temperatures preferably around 380° C. A product is obtained which consists mainly in benzoic acid, the yield being about 60–90% of the theory based on the amount of crude phthalic anhydride consumed.

Example 13

Freshly precipitated aluminum hydroxide containing 10 parts of $Al_2O_3$ is dissolved in a 2 N. sodium hydroxide solution to form sodium aluminate with a 10% excess of caustic soda. 6 parts of aluminum sulphate with 18 mols of water are dissolved in 200 parts of water and 17–18 parts of "Celite" brick refuse, or other material such as activated carbon, polysilicates and the like are stirred in. Examples of polysilicates which are well suited are those of calcium, copper, iron, zinc, titanium, zirconium and thorium, both natural and artificial products being usable. The aluminum sulphate is then gradually added to the aluminate solution with vigorous agitation until the mixture remains strongly alkaline to litmus and preferably neutral to phenolphthalein. The reaction product is freed from the mother liquor, dried at temperatures below 100° C. and broken into small fragments.

A modified contact mass may be obtained by hydrating the fragments by means of trickling water over them and then subjecting them to base exchange by trickling 5 to 10% salt solution thereover. By this means one or more bases such as those containing iron, copper, cobalt, silver, lead, manganese or thorium may be introduced. The base exchange bodies obtained may also be impregnated with phosphoric acid or chromic acid in order to form the corresponding salt like body.

Other metallates may replace partly or wholly the aluminate, and many other metal salts may replace the aluminum sulphate, partly or wholly.

The contact mass compositions obtained above may also be leached with dilute organic or inorganic acids such as 1 to 2% hydrochloric acid, enhancing the porosity of the contact masses.

A converter is filled with contact mass prepared as described above and vapors of crude phthalic anhydride mixed with hydrogen and steam in the proportion of 1 kilo of crude phthalic anhydride to 6–10 cbm. of hydrogen and 30 kilos of steam is passed over the contact mass at 360–390° C. Benzoic acid is obtained with a conversion yield of about 75%.

The above contact mass compositions may also be used for the production of other monocarboxylic acids and their derivatives from other polycarboxylic acid substances. Thus, for example, naphthalic anhydride can be split to give good yields of naphthoic acid; diphenic acid may be transformed into phenylbenzoic acid; maleic acid may be transformed into acrylic acid, with the production of some propionic acid. Succinic acid may be transformed into propionic acid, and pyrotartaric acid may be transformed into butyric acid. The reaction conditions are similar to those described above, and it has been found that the presence of steam appears to favor the reaction. These splitting reactions are preferably carried out in converters of aluminum or copper.

Example 14

Instead of using solid catalysts, metal carbonyls may be used as gaseous catalysts, thus, for example, crude phthalic anhydride vapors admixed with hydrogen, with or without steam or with other reducing gases as described in the foregoing examples, are heated in contact with metal carbonyls such as iron carbonyl or a mixture of iron and nickel carbonyl. The carbonyls may be ready formed or produced in situ. Benzaldehyde or a mixture of benzaldehyde and benzoic acid is ordinarily obtained. As an example of such a reaction, gases containing carbon monoxide, such as water gas, may be passed over iron at a suitable temperature to produce a certain amount of iron carbonyl, then mixed with vapors of crude phthalic anhydride and passed through a hot zone where the temperature is maintained preferably between 360–380° C. Benzoic acid and benzaldehyde are the main products, and yields up to 85% of the theory are obtained.

Instead of using gaseous catalyst, powdered catalyst may be used, and may be mixed with crude phthalic anhydride and sprayed into reducing gases such as hydrogen, with or without steam, or methyl alcohol, the spraying being into a hot zone, preferably about 360° C. Benzoic acid is obtained in good yields, with or without some benzaldehyde, depending on the duration of the heating.

It will be evident that reducing gases which contain serious poisons for hydrogenations and reductions are effectively utilizable for the reactions of the present invention without purification.

*Example 15*

Polycarboxylic acid substances may be split to monocarboxylic acids in the liquid phase. Thus, for example crude phthalic anhydride is filled into an autoclave, with or without a solvent such as cyclohexane or tetraline, and 3 to 5% of copper carbonate precipitated in kieselguhr is added. The autoclave is preferably lined with aluminum, copper, zinc or alloys of chromium. The mixture is heated in the autoclave to 200–250° C., and hydrogen or hydrogen containing gases are pumped in at a pressure of about 10–20 atmospheres. The heat is maintained for from 3 to 10 hours, and at the end of the reaction most of the crude phthalic anhydride is converted into benzoic acid with some amounts of benzaldehyde, which vary with the reaction conditions.

Instead of using copper as a catalyst, zinc, aluminum, titanium, zirconium, vanadium, thorium, chromium, manganese or cobalt may be present as catalysts, singly or in admixture.

Instead of using hydrogen containing gases, crude phthalic anhydride mixed with methyl alcohol and the finely divided catalysts mentioned above may be heated in a closed autoclave at 250° C., large amounts of the phthalic anhydride being transformed into benzoic acid and methyl benzoate. Other solvents, such as cyclohexane or tetraline, may be present in addition to the methyl alcohol, and it is sometimes desirable to introduce some hydrogen. The methyl alcohol may be anhydrous or may contain water, it being understood that the present reaction may be carried out in the liquid phase in the presence of water, which of course during the reaction is normally, though not necessarily, present in the gaseous phase.

What is claimed as new is:

1. A method of producing monocarboxylic acids from substances included in the group consisting of crude polycarboxylic acids and crude polycarboxylic anhydrides which comprises subjecting the crude polycarboxylic acid or anhydride produced by the catalytic vapor phase oxidation of organic compounds to a purification involving fractional condensation from a vapor stream, separating out a portion of the polycarboxylic acid or anhydride in a relatively pure state and subjecting the remaining portion, containing the major part of the impurities, to the action of a carboxy splitting catalyst at an elevated temperature.

2. A method according to claim 1, in which the carboxy splitting takes place in the presence of a protecting gaseous medium.

3. A method according to claim 1, in which the carboxy splitting takes place in the presence of a protecting medium, said protecting medium containing at least one gas from the group consisting of hydrogen and steam.

4. A method according to claim 1, in which the carboxy splitting takes place in the presence of steam.

5. A method of producing aromatic monocarboxylic acids from substances included in the group consisting of crude aromatic polycarboxylic acids and crude aromatic polycarboxylic anhydrides which comprises subjecting the crude polycarboxylic acid or anhydride produced by the catalytic vapor phase oxidation of aromatic compounds to fractional condensation from a vapor stream, separating out a portion of the aromatic polycarboxylic acid or anhydride in a relatively pure state and subjecting the remaining portion, containing the major part of the impurities, to the action of a carboxy splitting catalyst at an elevated temperature.

6. A method of producing benzoic acid from crude phthalic anhydride which comprises subjecting crude phthalic anhydride produced by the catalytic vapor phase oxidation of naphthalene to fractional condensation from a vapor stream, separating out a portion of the phthalic anhydride in a relatively pure state and subjecting the remaining portion, containing the major part of the impurities, to the action of a carboxy splitting catalyst at an elevated temperature.

7. A method according to claim 6, in which the splitting takes place in the presence of a protecting gas or vapor.

8. A method according to claim 6, in which the splitting takes place in the presence of a protecting gas or vapor from the group consisting of hydrogen and steam.

9. A method according to claim 1, in which the carboxy splitting catalyst contains at least one compound of a metal falling within the group consisting of zinc, copper, cadmium.

10. A method according to claim 6, in which the carboxy splitting catalyst contains at least one compound of a metal falling within the group consisting of zinc, copper, cadmium.

11. A method according to claim 1, in which the carboxy splitting catalyst contains at least one compound of a metal falling within the group consisting of zinc, copper, cadmium, the carboxy splitting reaction taking place in the presence of a protecting vapor contained in the group consisting of hydrogen, steam.

12. A method according to claim 6, in which the carboxy splitting catalyst contains at least one compound of a metal falling within the group consisting of zinc, copper, cadmium, the carboxy splitting reaction taking place in the presence of a protecting vapor contained in the group hydrogen, steam.

13. The process of producing monocarboxylic acids which comprises passing the gas mixture resulting from the catalytic manufacture of a dicarboxylic anhydride in the vapor phase at between about 350° and 450° C. over a catalyst comprising beryllium oxide.

14. The process of producing benzoic acid which comprises subjecting naphthalene vapor to catalytic oxidation to phthalic anhydride and passing the resulting gas mixture at between about 350° and about 450° C. over a catalyst comprising beryllium oxide.

15. The process of producing a monocarboxylic acid which comprises passing the vapor of a dicarboxylic acid at reaction temperature over a catalyst comprising beryllium oxide.

16. The process of producing benzoic acid which comprises passing the vapor of phthalic anhydride together with water vapor at reaction temperature, over a catalyst comprising beryllium oxide.

17. The process of producing a monocarboxylic acid which comprises passing the vapor of a dicarboxylic acid at a temperature between 350 to 450° C. over a catalyst comprising beryllium oxide.

18. The process of producing benzoic acid which comprises passing the vapor of phthalic anhydride together with water vapor at a temperature between 350 and 450° C. over a catalyst comprising beryllium oxide.

ALPHONS O. JAEGER.